US009969138B2

(12) United States Patent
Villeneuve et al.

(10) Patent No.: US 9,969,138 B2
(45) Date of Patent: May 15, 2018

(54) MOLD FOR A TIRE HAVING A SHELL WITH REMOVABLE PARTS

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Bernard Villeneuve, Clermont-Ferrand (FR); Anthony Gueugneau, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges, Paccot (CH)

( * ) Notice: Subject to any disclaimer, the term of this patent is extended or adjusted under 35 U.S.C. 154(b) by 0 days. days.

(21) Appl. No.: 14/910,620

(22) PCT Filed: Jun. 26, 2014

(86) PCT No.: PCT/IB2014/001224
§ 371 (c)(1),
(2) Date: Feb. 5, 2016

(87) PCT Pub. No.: WO2015/019138
PCT Pub. Date: Feb. 12, 2015

(65) Prior Publication Data
US 2016/0193796 A1 Jul. 7, 2016

(30) Foreign Application Priority Data
Aug. 5, 2013 (FR) .................................... 13 01881

(51) Int. Cl.
*B29D 30/06* (2006.01)
*B29C 33/30* (2006.01)
(Continued)

(52) U.S. Cl.
CPC ........ *B29D 30/0606* (2013.01); *B29C 33/306* (2013.01); *B29D 30/0629* (2013.01);
(Continued)

(58) Field of Classification Search
CPC ...................... B29D 30/0606; B29D 30/0662; B29D 30/72; B29D 2030/0616; B29C 33/30; B29C 33/306; B29C 33/424
See application file for complete search history.

(56) References Cited

U.S. PATENT DOCUMENTS 1,567,402 A * 12/1925 Venn ..................... B29C 33/424
152/523
1,632,310 A 6/1927 Paynter
(Continued)

FOREIGN PATENT DOCUMENTS

DE 102007005455 A1 8/2006
DE 102010017251 A1 12/2011
WO 2010076502 A1 7/2010

*Primary Examiner* — James P MacKey
(74) *Attorney, Agent, or Firm* — Dickinson Wright PLLC

(57) ABSTRACT

A mold for vulcanizing and molding a tire is disclosed herein. The tire includes a tread delimited by two sidewalls, and the mold includes a ring for molding the tread of the tire and two shells having tire-molding surface features for molding the sidewalls. At least one of the shells has a removable shell part extending circumferentially on the side of the sidewall of the tire to be molded, with the tire-molding surface features being incorporated into the removable shell part.

9 Claims, 3 Drawing Sheets

(51) Int. Cl.
   *B29D 30/72*      (2006.01)
   *B29L 30/00*      (2006.01)
   *B29C 33/42*      (2006.01)
(52) U.S. Cl.
   CPC ............ *B29D 30/72* (2013.01); *B29C 33/424* (2013.01); *B29D 30/0662* (2013.01); *B29D 2030/0612* (2013.01); *B29D 2030/0616* (2013.01); *B29D 2030/726* (2013.01); *B29K 2905/02* (2013.01); *B29L 2030/007* (2013.01)

(56) References Cited

U.S. PATENT DOCUMENTS

| | | | | | |
|---|---|---|---|---|---|
| 1,969,083 | A | * | 8/1934 | Lawson | B29D 23/24 425/28.1 |
| 2,296,016 | A | * | 9/1942 | Bostwick | B29C 33/424 264/293 |
| 2,679,663 | A | * | 6/1954 | Schwemler | B29D 30/0633 425/28.1 |
| 3,518,335 | A | * | 6/1970 | Jablonski | B29D 30/0606 152/523 |
| 3,901,632 | A | * | 8/1975 | Prosdocimi | B29D 30/0629 425/39 |
| 4,547,139 | A | | 10/1985 | Hershberger | |
| 5,288,499 | A | | 2/1994 | Mauro | |
| 5,643,519 | A | | 7/1997 | Mauro et al. | |
| 5,939,002 | A | * | 8/1999 | Heindel | B29D 30/0606 249/56 |
| 6,315,539 | B1 | * | 11/2001 | Yutronkie | B29D 30/0606 249/103 |
| 6,382,943 | B1 | * | 5/2002 | Metz | B29D 30/0606 29/428 |
| 6,942,476 | B2 | * | 9/2005 | Parmelee | B29C 33/32 249/103 |
| 7,883,326 | B1 | * | 2/2011 | Parmelee | B29D 30/0606 249/103 |
| 2011/0318532 | A1 | * | 12/2011 | Dusseaux | B29D 30/0629 428/141 |

* cited by examiner

MOLD FOR A TIRE HAVING A SHELL WITH REMOVABLE PARTS

This application is a 371 national phase entry of PCT/IB2014/001224, filed 26 Jun. 2014, which claims the benefit of French Patent Application No. 13/01881, filed 5 Aug. 2013, the contents of which are incorporated herein by reference for all purposes.

BACKGROUND

The disclosure relates to molds for tires. More specifically, it relates to the molding of elements of various shapes on the sidewalls of these tires.

DESCRIPTION OF RELATED ART

It is known that the sidewalls of tires have a large number of markings, such as the manufacturer's mark, the type of tire, the size of the tire, etc. These markings are obtained by providing techniques that are able to mold these markings, referred to below as "marking techniques", on the mold, and more particularly on side parts of this mold that are referred to as "shells". The shells are rotationally symmetrical parts, generally made of steel, and the patterns or markings to be reproduced on the tires are produced by machining, for example by etching or milling. When these parts are difficult to produce by conventional machining techniques, such as by turning or milling, it is possible to obtain them by using aluminium parts obtained by casting. It is then possible to use a wide variety of patterns to be imprinted.

However, depending on the type of tire to be produced, it may be necessary to change the patterns initially provided.

U.S. Pat. No. 4,547,139 discloses the use of removable plates placed in a shell of a mold. These plates have marking techniques that include indications which have to be changed regularly, for example the tire manufacturing period. However, because the plate has a relatively small size, the area of the elements it can contain is limited. It is thus not possible to incorporate a significant area of tread pattern elements into the sidewalls. Moreover, fixing the plate in the mold is complex.

Document JP61019314 discloses the use of a removable insert in the form of an annular one-piece part. More particularly, this annular insert is housed in a groove extending in a shell of the mold. This insert then has a relatively large diameter, thus requiring great precision in its production in order that it satisfactorily fits in the groove, specifically around the entire circumference of this groove.

Finally, document WO2010/076502 describes a lining assembly for a tire mold having a removable shell part provided with opposing first and second surfaces, the first surface being in contact with a support block of a mold, the second surface bearing a plurality of protruding lining elements, these elements being intended to form the tread patterns for a tire tread. It is stated that the support surface is substantially smooth and has a shape that more or less matches the overall curvature of the tread of the tire to be molded. Thus, this profile is complex and costly to produce and can only be used for the patterns on the tread of the tire.

Document DE102007005455 describes a mold for vulcanizing and molding a tire. This mold comprises at least one shell for molding the sidewall of the tire. An insert can be fitted in this shell, with the insert having hollows and reliefs for marking the sidewall of the tire. The insert thus described by the document is made of plastics material or silicone.

Document WO2010076502 discloses a set of linings including a skin having two opposite surfaces, the first being intended to be in contact with a support block of a tire mold and a plurality of lining elements projecting from the second surface of the skin, the lining elements being intended to form tread patterns on a part of a radially external surface of a tire. This document relates only to the molding of the region corresponding to the tread of the tire.

There is thus a need to provide a solution for replacing molding patterns that extend over the sidewalls of a tire which makes it possible to provide a sufficient molding area, while being easier and more practical to realize than in the related art.

SUMMARY

A first subject of an embodiment of the invention consists in providing a mold specifically designed for molding patterns and/or markings that extend over the sidewalls of the tires.

Another subject of an embodiment of the invention consists in providing a tire mold in which the sidewall patterns are produced with a very high level of precision.

To this end, the an embodiment of the invention provides a mold for vulcanizing and molded a tire, the tire including a tread delimited by two sidewalls, the mold including a ring intended for molding the tread of the tire and two shells having tire-molding surface features for molding the sidewalls, at least one of the shells intended for molding one of the sidewalls having a removable shell part, the thickness of which is between 0.25 and 4.00 mm, and preferably between 2.50 and 3.00 mm, extending circumferentially on the side of the sidewall of the tire to be molded, with the molding surface features being incorporated into the removable shell part. The removable shell part is preferably in the form of an annulus.

By virtue of this architecture, the changes in molding configuration for incorporating shell parts or sections with different molding surface features can be carried out easily and quickly. The necessity of replacing the shells as a whole, which would be more expensive, is also avoided.

According to one advantageous embodiment, the shell has an annular bearing face against which the removable shell part is disposed. In one exemplary embodiment, the bearing face is substantially planar. In another exemplary embodiment, the bearing face has a substantially curved profile, the face adjacent to the removable shell part having a substantially corresponding shape. These different embodiments make it possible to provide an interface that is easy to produce and has good features of resistance to molding forces. It is also easier to fix the removable shell part to the shell.

According to yet another embodiment, the tire-molding surface features are positioned substantially along the entire length of the shell of the mold.

Preferably, the removable shell part is formed from a plurality of sections that are positioned circumferentially one after another against the bearing surface of the shell. This embodiment affords great flexibility. The aspects disclosed herein propose manufacturing a shell in a plurality of elements in order to make it easier to produce. Moreover, since each section has limited dimensions, it is easier to fit them in the mold. In addition, if modifications are made to the features of patterns or markings on the sidewall of the tire, only those shell parts that include the regions affected by these modifications are replaced. It is thus not necessary to replace all of the shell. This aspect disclosed herein make it possible, for example, to provide at least two sections having different molding surface features.

According to one advantageous embodiment, at least one section is produced by laser sintering, said section having all or some of the molding surface features. The laser sintering method is a method which consists in constructing a part layer by layer by successively superposing layers of powder and selectively fusing this powder. This method may be computer-aided, making it possible to construct fairly complex parts. By using this sintering method for producing sections, it is possible to form complex arrangements of patterns and/or markings on these insert parts, making it possible to improve the aesthetic and/or operational features of the tire.

In another embodiment, at least one section is produced from cast aluminium.

In another embodiment, the shell and the removable shell part include a through-opening, for example a bore, extending between the sidewall and the outside of the shell. This type of arrangement makes it possible to introduce a technique for removing the shell when the latter is force-fitted in the mold. In a variant, a plurality of openings or bores are distributed around the circumference, for example one per section.

In another embodiment, one section is provided with an L-shaped tongue designed to be inserted into a groove of suitable shape provided at the support face of the shell.

In another embodiment, complementary U-shaped annular elements provided under the removable shell part and on the support face make it possible to position the removable shell part.

DESCRIPTION OF THE FIGURES

Further features and advantages will become apparent from the following description, given by way of non-limiting example, with reference to the attached drawings, in which.

In the following description, elements which are substantially identical or similar will be denoted by identical references.

DETAILED DESCRIPTION

A "tire" is defined by all types of resilient tread whether or not it is subjected to an internal pressure.

The "tread" of a tire is defined by a quantity of rubber compound delimited by lateral surfaces and by two main surfaces, one of which is intended to come into contact with a road surface when the tire is running.

The "sidewall" of a tire is defined by a lateral surface of the tire, said surface being disposed between the tread of the tire and a bead of this tire.

A "tread pattern" is defined by the volumetric and surface arrangements of rubber compounds at the external surface of the tire, said arrangements being intended to ensure contact with the roadway and having a shape for adapting the operational performance of the tire. The tread patterns also confer an aesthetic appearance on the tread or some other region of the tire, such as the sidewalls.

The "bead" of a tire is defined by a part of the tire that is intended to be seated on a wheel rim.

A "mold" is defined by a collection of separate molding elements which, when brought closer together, delimit a toroidal molding space for vulcanizing and molding a tire.

The "equatorial plane" is defined by a plane perpendicular to an axis of revolution of the mold, separating this mold into two identical half-molds.

The "meridian plane" is defined by a plane containing the axis of revolution of the mold.

Figure 1:
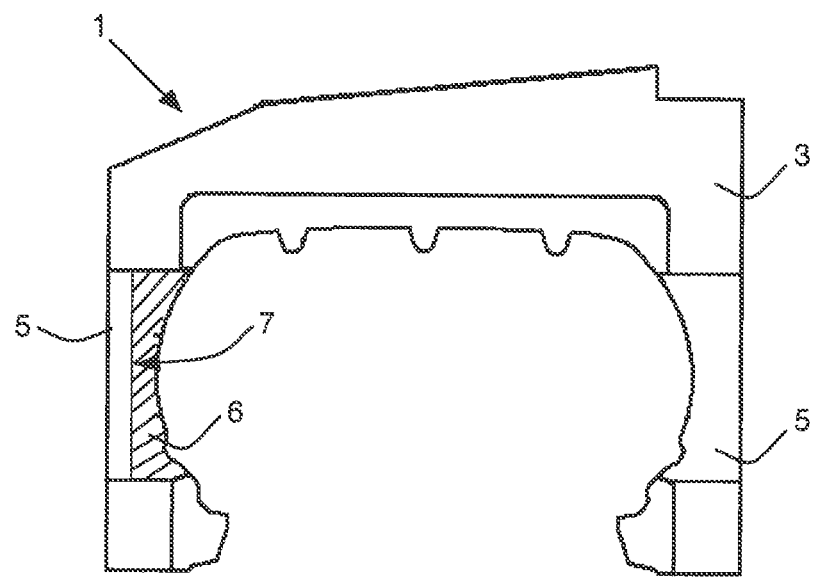
FIG. 1 schematically shows a view in cross section of a mold provided with an annular insert produced according to one of the embodiments of the invention.

As can be seen in FIG. 1, the mold 1 includes a ring 3 intended for molding the tread of a tire and two shells 5 extending around the circumference of the sidewalls in order to mold the latter. A removable shell part 6 (or removable annulus) is mounted in a removable manner on a bearing face 7 of the shell. The removable shell part 6 has tire-sidewall-molding surface features 8. These forming/molding elements are provided so as to fashion patterns, markings, decorations, or any visible element likely to be provided in the region of the sidewall of the tire to be molding, or to confer a particular aesthetic appearance, and/or to provide identification elements for the tire to be produced.

In the exemplary embodiments illustrated, the tire-molding surface features 8 are positioned substantially over the entire height of the shell.

Further arrangements along the height of the sidewall can also be provided.

Figure 3:
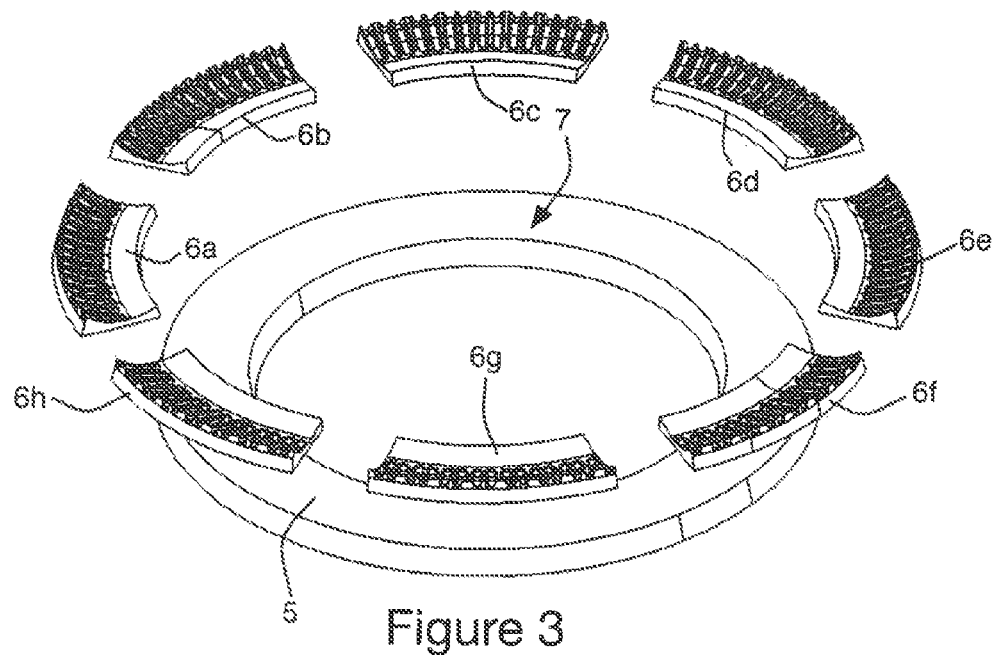
FIG. 3 schematically shows a perspective view of an example of a shell with a removable shell part in a plurality of sections according to one of the embodiments of the invention.

As shown in the exemplary embodiment in FIG. 3, the removable shell part can be formed from a plurality of sections 6a to 6h that are aligned angularly one after another so as to form an annulus with suitable dimensions for insertion at the location provided for the shell.

Figure 2:
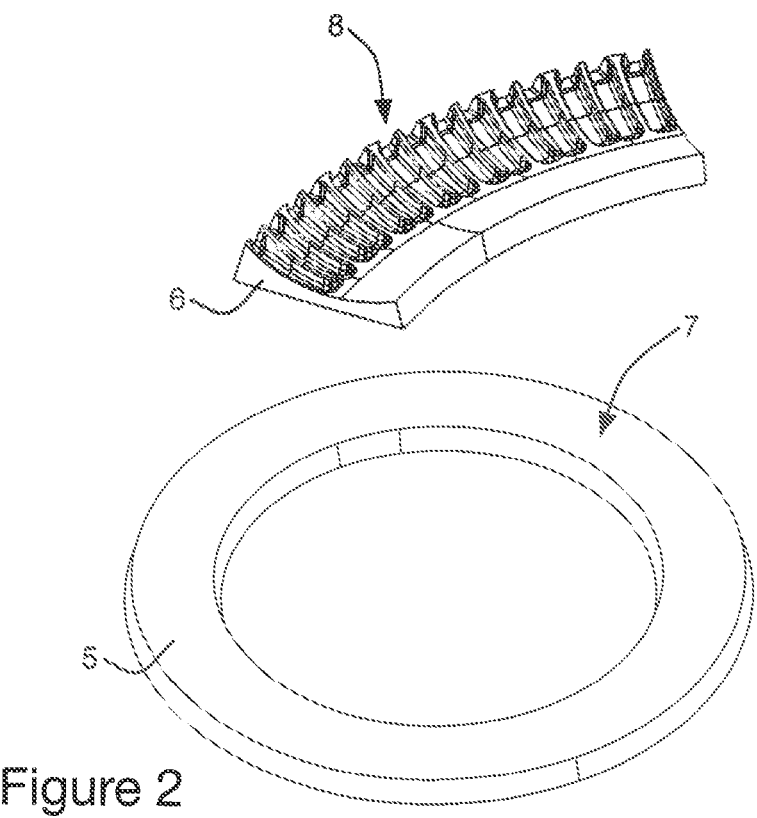
FIG. 2 schematically shows a perspective view of an example of a shell with a removable shell part according to one of the embodiments of the invention.

In FIGS. 2 and 3, the bearing face 7 and the rear face of the removable shell part are substantially planar and have corresponding shapes.

Figure 4:
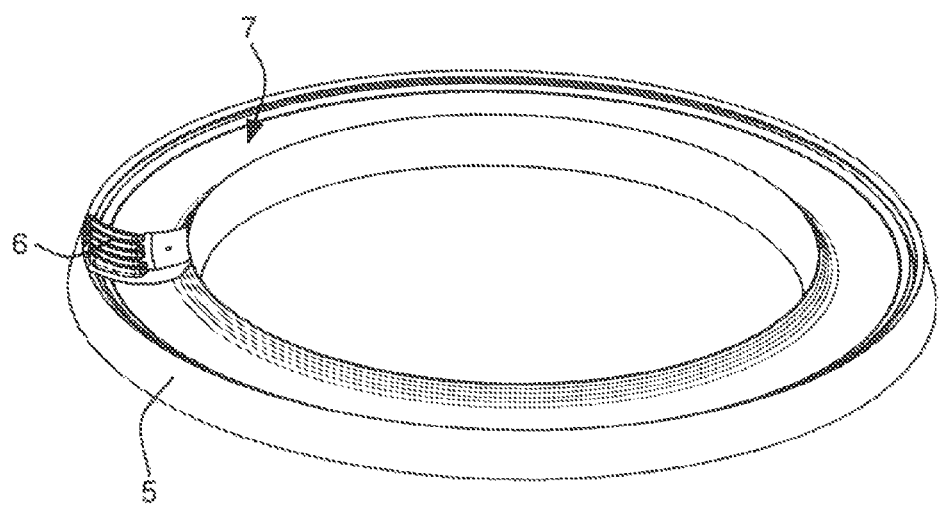
FIG. 4 schematically shows a perspective view of an example of a shell with a removable shell part according to one of the embodiments of the invention with a curved interface.

In the variant embodiment presented in FIG. 4, the shell bearing face 7 has a substantially concave profile. Such a profile makes it possible to provide a removable shell part or section of low thickness, but with a firm and effective hold, ensuring the rigidity of the shell/removable shell part assembly.

In these variant embodiments, positioning the removable shell part or sections on the bearing face of the shell confers solid support for effectively withstanding the molding forces.

Figure 5:
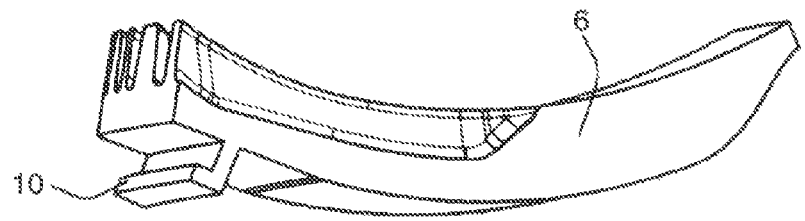
FIGS. 5 and 6 schematically show perspective views of an example of a shell with a removable shell part according to the invention with an L-shaped tongue and fixing groove.
Figure 6:
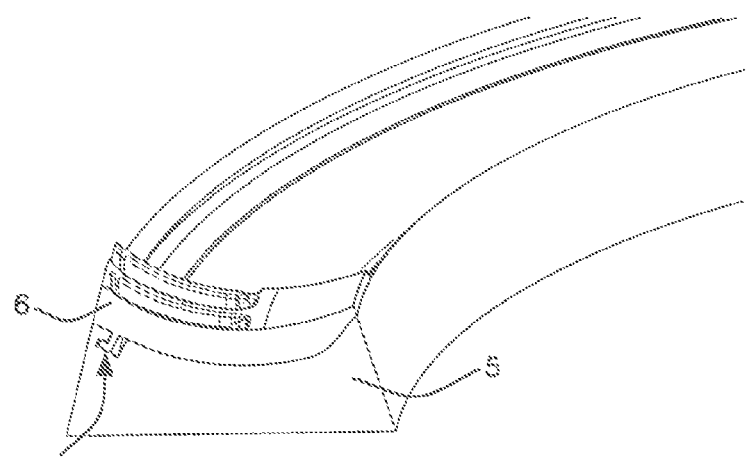

The quick and easy fixing of the sections on the support face constitutes another of the advantages of the present invention. For example, FIGS. 5 and 6 show an exemplary embodiment in which a section is provided with an L-shaped tongue 10. This tongue is designed to be inserted into a groove 11 of appropriate shape that is provided at the support face of the shell. The far edge of the tongue can be adhesively bonded or screwed to the shell.

Figure 7:
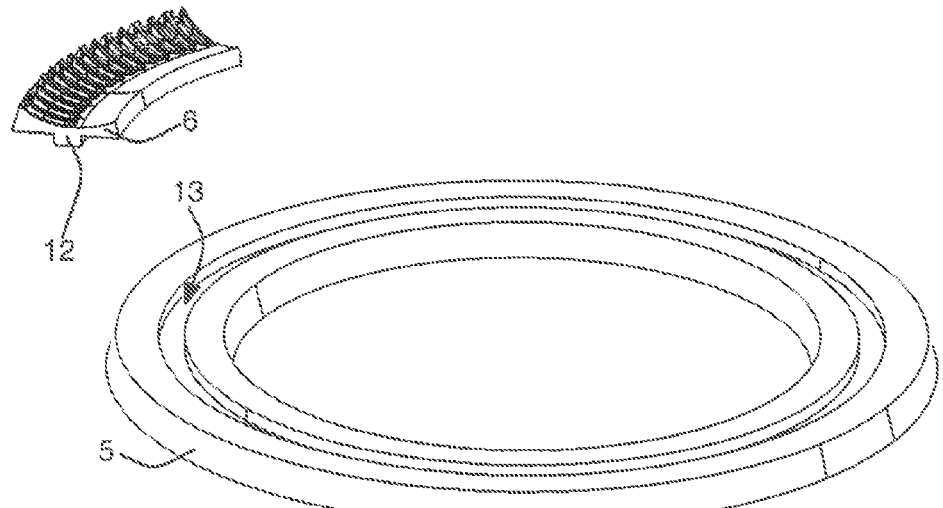
FIG. 7 schematically shows a perspective view of an example of a shell with a removable shell part according to one of the embodiments of the invention with a U-shaped tongue and fixing groove.

FIG. 7 shows another exemplary embodiment, in which complementary U-shaped elements 12 and 13 provided under the removable shell part and on the support face make it possible to reliably and precisely position the removable shell part, which can otherwise be screwed or adhesively bonded to the shell.

It has been found that the procedure of substituting sections for others with other patterns is very easy and inexpensive to carry out.

The reference signs in the claims are entirely non-limiting. The verbs "comprise" and "have" do not exclude the presence of elements other than those listed in the claims. The word "a/an" preceding an element does not preclude the presence of a plurality of such elements.

The invention claimed is:

1. A mold for vulcanizing and molding a tire, comprising:
   the tire including a tread delimited by two sidewalls,
   the mold including a ring for molding the tread of the tire and two shells having tire-molding surface features for molding the sidewalls,
   wherein at least one of the shells has a removable shell part, the thickness of which is between 0.25 and 4.00 mm, extending circumferentially, one of the two sidewalls being molded, the molding surface features being incorporated into the removable shell part, and
   further comprising a L-shaped element, wherein the removable shell part has a first surface with a first shape, and the L-shaped element is provided on the first surface, extending outward from the removable shell part with a different shape than the first shape, and within a bearing face, a L-shaved groove sized to fit the L-shaped element, the L-shaped groove facilitating positioning for the removable shell part, and the bearing face being conformed to fit with the first shape and the different shape.

2. A mold according to claim 1, wherein the bearing face defines an annular surface against which the removable shell part is disposed.

3. A mold according to claim 2, wherein the bearing face is substantially planar.

4. A mold according to claim 2, wherein the bearing face has a substantially curved profile, the substantially curved profile adjacent to the removable shell part having a substantially corresponding shape.

5. A mold according to claim 1, wherein the removable shell part is defined by a plurality of sections that are positioned one after another against the bearing face of the shell.

6. A mold according to claim 5, wherein each section has a molding surface able to be in contact with the tire, characterized in that at least two sections have different moulding surface features.

7. A mold according to claim 1, wherein at least one section of the plurality of sections is produced by laser sintering, the one section having all or some of the molding surface features.

8. A mold according to claim 1, wherein the at least one section is produced from cast aluminium.

9. A mold according to claim 1, wherein the L-shaped element is adapted to mate with the L-shaped groove in the radial direction without requiring sliding the L-shaped element circumferentially along the L-shaped groove.

* * * * *